Patented Aug. 14, 1934

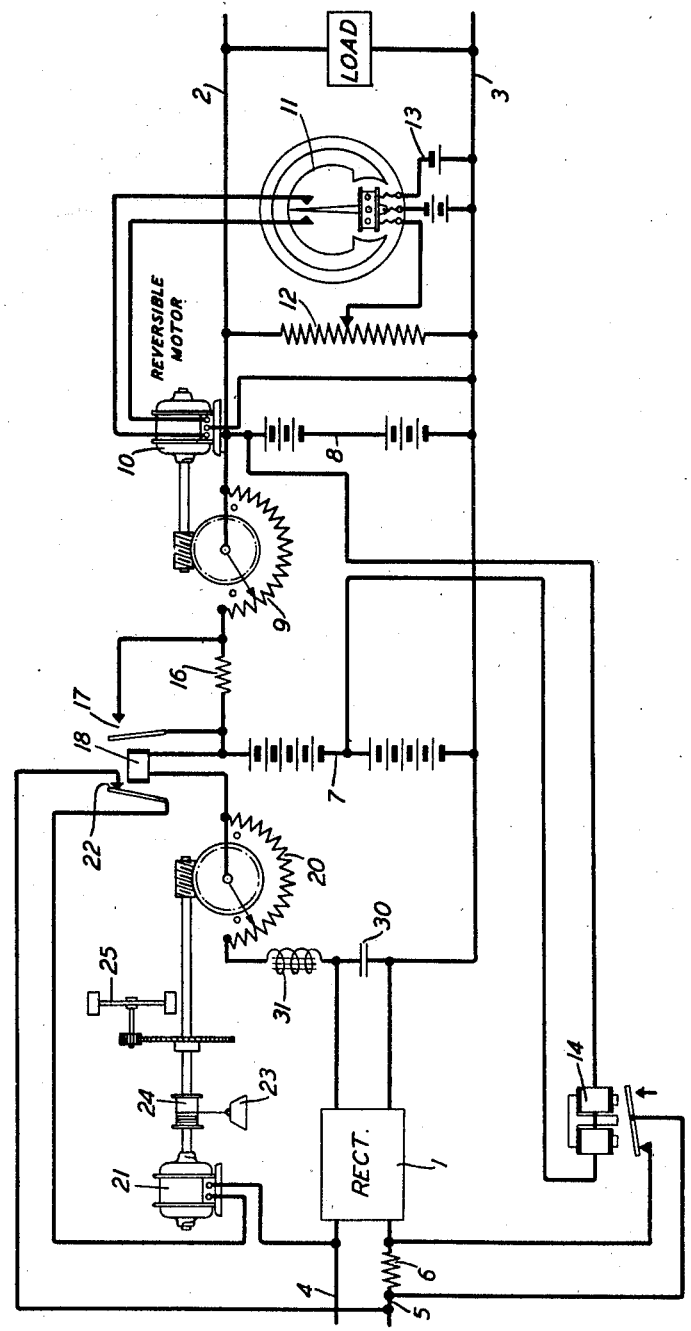

1,970,329

UNITED STATES PATENT OFFICE 1,970,329

BATTERY CONTROL CIRCUIT

Warren A. Marrison, Maplewood, N. J., assignor to Bell Telephone Laboratories, Incorporated, New York, N. Y., a corporation of New York Application August 27, 1931, Serial No. 559,606

18 Claims. (Cl. 171—314)

This invention relates to battery control circuits and particularly to battery control circuits for maintaining constant voltage on load circuits for long periods of time.

One object of the invention is to provide a battery control circuit that shall insure an uninterrupted supply of constant voltage to a load circuit for extended periods of time.

Another object of the invention is to provide a source of current for supplying a load circuit with current at constant voltage and storage batteries for supplying constant voltage to the load circuit in case of failure of the primary source of current while insuring against interruption or change in voltage on the load circuit upon failure or return of the source of current.

Another object of the invention is to provide a battery control system having a source of current connected to a load circuit, two batteries of different sizes connected across the load circuit and a rheostat in the load circuit between the batteries for controlling the potential on the load circuit beyond the batteries that shall prevent variation in the voltage on the load circuit either upon failure of the source and transfer of the load to the batteries or upon return of the source and transfer of load from the batteries to the source.

A further object of the invention is to provide a battery control circuit having a rectifier connected betwen an alternating current supply circuit and a load circuit and batteries of different sizes connected across the load circuit that shall control the voltage of the alternating current in accordance with the potential difference between normally equal potential points on the two batteries and that shall increase the impedance between the rectifier and the batteries and decrease the impedance between the batteries upon failure of the rectifier or upon failure of the alternating current source.

In some instances it is essential to have a constant voltage supplied without interruption to a load circuit for extended periods of time which may be for a number of years. One instance where constant voltage supply is required for extended periods of time without interruption is the power supply for a standard frequency oscillator which is used as a reference standard. When operating such oscillators it is often essential to deliver constant frequency current for long periods of time without any possibility of interruption. The power supply to the oscillators must not only be uninterrupted for long periods of time but must be held at all times at substantially constant voltage. The voltage of the power supply must be held constant because even with the best oscillators that can be built there are slight variations in frequency with variations in voltage of the power supply.

In a battery control system constructed in accordance with the invention, a main source of current and an auxiliary source of current are connected to a load circuit. Normally power is supplied to the load circuit from the main source of current with provision for supplying power from the auxiliary source of current in case of failure of the main source. Regulating means are provided for maintaining the voltage on the load circuit constant and further means are provided for preventing any interruption in the supply of current to the load circuit or any variation in the voltage when the load is transferred from the main source to the auxiliary source. Provision is also made to insure against any break in the supply of current to the load circuit or any variation in the voltage when the load is transferred back from the auxiliary source to the main source of current.

In the system employed to describe the invention, the load circuit is connected to a rectifier which in turn is connected to a source of alternating current. Across the load circuit are connected two batteries of different sizes with the larger battery adjacent to the rectifier. A motor operated rheostat is connected in the load circuit between the two batteries and is controlled in accordance with the potential across the load circuit to maintain the load circuit voltage constant.

A resistance element in the load circuit between the two batteries is automatically shunted upon failure of the rectifier or the alternating current source for insuring against an abrupt change in voltage on the load circuit in case of failure of the rectifier or the alternating current source. A rheostat is positioned between the rectifier and the batteries for insuring against an abrupt change of voltage on the load circuit when the load is transferred from the batteries to the rectifier after a failure of the rectifier or the source of alternating current. During normal operation the rheostat between the rectifier and the batteries is in a position to place little or no resistance between the rectifier and the batteries. Upon failure of the rectifier or the alternating current source the rheostat is automatically operated to place resistance of an appreciable value between the rectifier and the batteries.

A polar relay having the energizing coil thereof positioned between the smaller battery and a normally equal potential tap on the larger battery is provided for controlling a resistance element in the connection between the source of alternating current and the rectifier for controlling the voltage of current supplied to the batteries.

The single figure in the accompanying drawing is a diagrammatic view of a battery control circuit constructed in accordance with the invention.

Referring to the drawing a rectifier 1 of any suitable type, and preferably a space discharge rectifier, is connected to a load circuit comprising conductors 2 and 3. A source of alternating current comprising conductors 4 and 5 is connected to the rectifier 1 through a regulating resistance element 6. Two batteries 7 and 8 are connected across the load conductors 2 and 3. The battery 7, which is positioned closer to the rectifier 1, is larger than the battery 8. Preferably the number of cells in the smaller battery 8 is chosen so that full load voltage may be supplied to the load conductors when the voltage per cell is 2.15. The number of cells in the larger battery 7 is chosen so that full load voltage may be supplied to the load conductors when the voltage per cell is 1.85.

In the load circuit between the batteries 7 and 8 is connected a rheostat 9. The rheostat 9 serves to maintain substantially constant voltage across the load conductors and is operated by a reversible motor 10 of any suitable type. The reversible motor 10 is controlled by a d'Ansonval galvanometer 11 according to the voltage across the supply conductors 2 and 3. However, any other very sensitive type of galvanometer may be employed. The potential which is obtained from a tap on a potentiometer 12 connected across the load conductors 2 and 3 is balanced against a standard electric cell 13 for operating the galvanometer 11 in accordance with the voltage across the load conductors. Preferably, the standard cell 13 is of the chloride of silver type so as to have an indefinite shelf life and have a small temperature coefficient. Unbalancing of the galvanometer 11 in either direction will operate the reversible motor 10 to control the rheostat 9 and maintain the potential across the load conductors substantially constant. By means of this galvanometer control of the rheostat 9, it is possible to control the load voltage to within one-thousandth of a volt per cell and to hold the voltage variations to within one-tenth of a volt for the whole battery.

In order to keep the voltage of the larger battery 7 at a proper value in spite of slight variations in the voltage of the alternating current source of supply, a polarized relay 14 is connected between a point having a potential of the entire smaller battery 8 and a normally equal potential tap from the larger battery 7. The polar relay 14 controls a shunt circuit around the regulating resistance element 6 between the source of alternating current and the rectifier 1. The voltage of the larger battery 7 is kept adjusted at preferably 2.15 volts per cell in terms of the standard cell. When the voltage of the battery 7 becomes higher than 2.15 volts per cell the polar relay is operated to open the shunt circuit around the regulating resistance 6 to decrease the charging rate. If the voltage of the larger battery 7 becomes less than 2.15 volts per cell the polar relay closes a shunt around the regulating resistance 6 to increase the charging rate.

In the case the source of alternating current for the rectifier fails and the load is suddenly thrown on the batteries 7 and 8, a surge in the load voltage will be produced. In order to prevent such sudden change in the load circuit voltage a control resistance element 16 is connected in the load circuit between the rheostat 9 and the larger battery 7. The resistance element 16 is under the control of contact members 17 of a relay 18. The energizing coil of the relay 18 is connected in the load circuit between the batteries and the rectifier. Normally, when power is being supplied to the load circuit from the rectifier 1, the relay 18 is energized to separate the contact members 17 and open a shunt circuit around the resistance element 16. Thus, under normal operating conditions when power is supplied from the rectifier, the resistance element 16 is in the load circuit. Upon failure of the source of alternating current or the rectifier 1, the relay 18 is deenergized to permit engagement between the contact members 17 and the closing of the shunt circuit around the resistance element 16. The shunting of the resistance element 16 upon transfer of the load from the rectifier to the batteries insures against any sudden drop in voltage at this time. The regulation of the voltage across the load conductors 2 and 3 is, of course, under the control of the motor operated rheostat 9 at all times. A sudden change in voltage by transfering the power from the rectifier to the battery would be more of a change than could be expected to be handled by the motor operated rheostat.

A motor operated rheostat 20 is positioned in the load circuit between the batteries and the rectifier 1. The rheostat 20 is operated in a direction to decrease the resistance in the load circuit by means of a torque motor 21 which is preferably an induction motor. The induction motor 21 is energized from the source of alternating current in series with a second set of contact members 22 controlled by the relay 18. The contact members 22 of the relay 18 are held closed when the relay is energized, whereas the contact members 17 before considered are held open when the relay is energized. Thus, in case the rectifier 1 fails when there has been no failure of the alternating current source, the relay 18 will be deenergized and the contacts 22 will be separated to break the circuit of the induction motor 21.

The contact arm of the rheostat 20 is rotated in a direction to increase the resistance in the load circuit between the rectifier and the battery by means of a weight 23 attached to a cord wound around the drum 24 on the motor shaft. When the motor 21 is deenergized either by reason of failure of the source of alternating current or by reason of the release of the relay 18, the weight 23 acting on the armature shaft will operate the rheostat to insert resistance in the load circuit beyond the rectifier. A flywheel 25 of any suitable type is geared to the motor shaft or to the rheostat in order to limit the speed of operation of the motor and the rheostat.

In case there has been failure of the alternating current source or of the rectifier 1 and power has been supplied by the battery 7 to the load circuit for a considerable period of time, it is apparent that sudden return of the power from the rectifier 1 would tend to produce a sudden voltage surge over the load circuit. The rheostat 20 which is controlled by the motor 21 and the weight 23 serves to prevent such surge of voltage over the load circuit upon transfer of the power load from the batteries to the rectifier. Upon return of the power and transfer of the load from the batteries to the rectifier, the induction motor 21 is energized and the contact arm of the rheostat is slowly operated to decrease the resistance of the rheostat 20 in the load circuit. When all or a larger portion of the resistance of the rheostat is excluded from the load circuit, the induction motor will be operated at one hundred per cent slip. A filter comprising a condenser 30 and an inductance element 31 is connected to the rectifier 1. This filter serves to smooth out the ripples in the rectified current.

Modifications in the circuit and in the arrangement and location of parts may be made within the spirit and scope of the invention and such modifications are intended to be covered by the appended claims.

What is claimed is:

1. In a battery system, a source of current connected to a load circuit, two batteries of different sizes each connected across the load circuit with the larger battery adjacent to said source, an adjustable resistance element and a fixed resistance element connected in the load circuit between said batteries, a shunt circuit around said fixed resistance element, means for opening and closing said shunt circuit according to the electrical condition of said source of current, and means for controlling said adjustable resistance element according to the potential across the load circuit beyond said batteries.

2. In a battery system, a source of direct current connected to a load circuit, a battery connected across the load circuit, a rheostat connected in the load circuit between the source and the battery, a second battery having a larger number of cells than the first mentioned battery and connected across the load circuit between said source and the rheostat, a fixed resistance element in the load circuit between the batteries, means for shunting said fixed resistance element according to the electrical condition of said source, and means for controlling said rheostat according to the voltage on the load circuit beyond the point of connection of the first mentioned battery.

3. In a battery system, a source of direct current connected to a load circuit, a battery connected across the load circuit, said battery serving as a filter to prevent voltage surges, an adjustable resistance element connected in the load circuit between the source and the battery, a second battery having a larger number of cells than the first mentioned battery and connected across the load circuit between said source and the resistance element, said second battery serving as the source of current for the load circuit upon failure of said source of direct current, a potentiometer connected across the load circuit beyond said batteries, a galvanometer for controlling said resistance element, a standard cell connected in series with said galvanometer and a portion of said potentiometer with the potential of the standard cell in opposition to the potential of the portion of the potentiometer, and means controlled by said galvanometer for governing said resistance element to maintain the voltage on the load circuit beyond the resistance element substantially constant.

4. In a battery system, a source of current connected to a load circuit, two batteries of different sizes each connected across the load circuit with the larger battery adjacent to said source and the smaller battery connected directly to the load, said larger battery serving as the main source of supply for the load circuit upon failure of said source of current and said smaller battery serving as a filter to prevent voltage surges, a rheostat connected in the load circuit between said batteries, a potentiometer connected directly across the load circuit beyond said batteries, a standard cell, a differential galvanometer connected in series circuit with said standard cell and a portion of said potentiometer and operated according to the difference in potential between the portion of said potentiometer and said standard cell, and means controlled by said galvanometer for operating said rheostat to maintain the voltage on the load circuit beyond the batteries substantially constant with high precision when said source of current is in operation and upon failure of said source of current.

5. In a battery system, a source of current connected in series with a resistance element to a load carrying circuit, two batteries of different sizes each connected across the load carrying circuit between the load on the load carrying circuit and said resistance element, impedance means in said load carrying circuit between the points of connection of the two batteries thereto, and means operated according to the variations in potential between normally equal potential taps on said batteries for governing said resistance element to control the charge on one of said batteries.

6. In a battery system, a source of alternating current, a rectifier connected between said source and a load circuit, two batteries of different sizes connected across the load circuit with the larger battery adjacent to said rectifier, an adjustable resistance element connected in the load circuit between said batteries, a resistance element connected between said source and the rectifier, and a relay having the energizing coil thereof connected between said batteries to be operated according to the charge on the battery adjacent to said rectifier for controlling the resistance element adjacent to said rectifier to control the charge on the battery adjacent to the rectifier.

7. In a battery system, a source of alternating current connected in series with a resistance element to a rectifier, two storage batteries of different sizes connected across a load circuit connected to said rectifier, impedance means in the load circuit between said batteries, and a polar relay having the energizing coil thereof connected between the equal potential taps on the two batteries for controlling said resistance element to govern the charge on the larger battery.

8. In a control system, a source of current connected to a load circuit, two batteries of different sizes each connected across the load circuit with the larger battery adjacent to the source, a resistance element normally in the load circuit between the batteries, and means automatically operated upon failure of said source for inserting resistance in the load circuit between the source and the batteries and for shunting the resistance in the load circuit between the batteries.

9. In a control system, a source of current connected to a load circuit, two batteries of different sizes each connected across the load circuit with the larger battery adjacent to the source, a control rheostat connected in the load circuit between the batteries, means for automatically operating said control rheostat according to the potential across the load circuit beyond the batteries, an auxiliary rheostat connected in the load circuit between said source and the batteries, and means for automatically operating said auxiliary rheostat upon failure of said source to insert resistance in the load circuit between the source and the batteries.

10. In a control system, a source of current connected to a load circuit, two batteries of different sizes each connected across the load circuit with the larger battery adjacent to the source, a resistance element and a rheostat connected in the load circuit between said batteries, means for automatically operating said rheostat according to the potential across the load circuit beyond the batteries, and means automatically operated upon failure of said source for shunting said resistance element.

11. In a control system, a source of current connected to a load circuit, two batteries of different sizes each connected across the load circuit with the larger battery adjacent to the source, impedance means connected in the load circuit between said batteries, a rheostat connected in the load circuit between said source and the batteries, and means for automatically operating said rheostat upon failure of said source to insert resistance in the load circuit between the source and the batteries.

12. In a control system, a source of current connected to a load circuit, two batteries of different sizes each connected across the load circuit with the larger battery adjacent to the source, a resistance element connected in the load circuit between said batteries, and means automatically operated upon failure of said source for shunting said resistance element.

13. In a control system, a source of current connected to a load circuit, two batteries of different sizes each connected across the load circuit between the load and the source, the larger battery being positioned before the smaller battery, a motor operated rheostat connected in the load circuit between said source and the batteries, a resistance element connected in the load circuit between said batteries, and means operative upon failure of said source for operating said rheostat to insert resistance in the load circuit between the source and the batteries and for shunting the resistance element between the batteries.

14. In a control system, a source of alternating current connected to a rectifier, a load circuit connected to said rectifier, a battery connected across said load circuit, a motor operated rheostat connected between said rectifier and the battery, and automatic means upon failure of said rectifier for operating said rheostat to insert resistance in the load circuit between the rectifier and the battery.

15. In a control system, a source of alternating current connected to a rectifier, a load circuit connected to said rectifier, a battery connected across the load circuit, a rheostat connected in the load circuit between said rectifier and the battery, means for automatically operating said rheostat upon failure of the current supplied by the rectifier to insert resistance in the load circuit.

16. In a control system, a source of alternating current connected to a rectifier, a load circuit connected to said rectifier, a battery connected across the load circuit, a rheostat connected in the load circuit between the rectifier and the battery, an alternating current torque motor connected to said source for operating said rheostat to reduce the resistance of the rheostat in the load circuit between said rectifier and the battery, control means for automatically operating said rheostat upon failure of the alternating current source to insert resistance in the load circuit between the rectifier and the battery, and means operated upon failure of the rectifier for opening the circuit of said motor to operate said control means and insert resistance in the load circuit between the rectifier and the battery.

17. In a control system a main source of current connected to a load circuit, an auxiliary source of current normally inactive and connected to said load circuit, impedance means normally in circuit between the load and the auxiliary source, and means automatically operated upon failure of said main source of current for placing resistance in circuit between the load and the main source and for shunting said impedance means.

18. In a battery system, a load carrying circuit, a source of current connected to said load carrying circuit, a rheostat in the load carrying circuit between said source and the load on the load carrying circuit, a potentiometer connected across the load carrying circuit beyond the point of connection of said rheostat thereto, a standard battery, a differential galvanometer connected in a series circuit including a portion of said potentiometer and the standard cell with the standard cell potential in opposition to the potential of the potentiometer to effect operation of the galvanometer according to the difference in potential between the portion of said potentiometer and said standard cell, and means controlled by said galvanometer for operating said rheostat to maintain the voltage on the load circuit beyond the rheostat substantially constant with precision.

WARREN A. MARRISON.